United States Patent [19]
Briselli et al.

[11] Patent Number: 5,466,286
[45] Date of Patent: Nov. 14, 1995

[54] STABLE AUTOMOTIVE AQUEOUS METALLIC-FLAKE TINT DISPERSION

[75] Inventors: Robert C. Briselli, Broomall; James F. Matthews, Berwyn, both of Pa.

[73] Assignee: E. I. du Pont de Nemours and Company, Wilmington, Del.

[21] Appl. No.: 250,261

[22] Filed: May 27, 1994

[51] Int. Cl.$^6$ .................................................. C09C 1/62
[52] U.S. Cl. ................................. 106/404; 106/403
[58] Field of Search .................... 106/403, 404

[56] References Cited

U.S. PATENT DOCUMENTS

| | | | |
|---|---|---|---|
| 4,350,535 | 9/1982 | Ishijima et al. | 106/404 |
| 4,453,982 | 6/1984 | Wilfinger et al. | 106/404 |
| 4,565,716 | 1/1986 | Williams, Jr. et al. | 106/404 |
| 4,762,568 | 8/1988 | Nakamura et al. | 106/404 |
| 5,011,533 | 4/1991 | Kuwajima et al. | 106/404 |
| 5,057,156 | 10/1991 | Kuwajima et al. | 106/404 |

*Primary Examiner*—Mark L. Bell
*Assistant Examiner*—Scott L. Hertzog

[57] ABSTRACT

A stable, air-dry, low-VOC waterborne metallic flake pigment dispersion containing an aqueous carrier, film-forming binder and metallic-flake pigment and having a solids content of about 10–30% by weight; wherein the metallic surface is passivated with a hydrophobically-modified aliphatic organic phosphate ester which is subsequently combined with an aqueous resin binder to stabilize the metallic flakes against long-term settling, gassing, floating, and reagglomeration of flake particles. The VOC of the resulting dispersion is about 2.5 to 3.5 lbs/gallon (minus water) and contains metallic flake pigments in a pigment-to-binder weight ratio of about 10/100 to 50/100. The dispersion can be used neat as a bright metallic waterborne base coating or combined with other colored dispersions and other compatible resinous materials.

8 Claims, No Drawings

STABLE AUTOMOTIVE AQUEOUS METALLIC-FLAKE TINT DISPERSION

BACKGROUND OF THE INVENTION

The present invention relates to a composition for a waterborne metallic-flake tint dispersion and a process of making the same. Specifically, it relates to tints which can be used alone, or more commonly in combination with other dispersions, as an air-dry or baking, low-VOC metallic-flake coating. Both immediate and long-term stability of metallic-flake tint dispersions are obtained.

It is well known in the art that various organic phosphate acid ester agents prevent or retard the reaction of water and aluminum flake, which otherwise may lead to the formation of potentially explosive hydrogen gas and the loss of desirable aesthetic effects. U.S. Pat. No. 4,350,535 disclose metallic-flake paste compositions which use such agents. U.S. Pat. No. 4,565,716 and U.S. Pat. No. 4,717,424 also describe such paste and coating formulations. In all these cases, however, the drawback is that the stability of the metal-containing paint is dependent upon how the metal paste or dispersion is mixed with the other paint components. While it is generally possible to obtain good aluminium stability and appearance by sufficiently stirring each component in individually, such appearance cannot be readily achieved when simply combining components in a can (without gradual or incremental mixing or stirring in of the second component) and then subsequently applying rejuvenation (mechanical shaking of the can) for a short time. The latter rejuvenation process is typical of automatic mixing-machine operations employed by automotive paint refinishers, especially in the U.S. The result of such a rejuvenation process has been aluminum flake which is unstable and not well incorporated into the liquid carrier. The product may even reagglomerate and flocculate, have poor aesthetics, or the metallic dispersion may separate from the rest of the paint components, which is visually perceived as an undesirable floating phenomenon or characteristic. Such defects may occur anytime, from immediately after rejuvenation until application and drying on a substrate. The magnitude of such a problem will vary depending on such factors as the presence of surfactants, solvent partitioning between the aqueous and particle phases, the shape and distribution of the metallic particles, surface tension, evaporation rate of solvents, and the temperature of the paint.

The present invention allows the user to formulate a metallic waterborne tint dispersion which can be used as a paint itself or can be combined with other (metallic or non-metallic) pigmented or non-pigmented waterborne dispersions to produce aqueous paints by rejuvenation or by mixing each component individually. The result is a paint which when sprayed on a substrate gives stable and reproducible appearance, commercial brightness, metallic two-tone, adequate humidity and water resistance, and dilutability with water as needed to adjust tinting strength, viscosity, and non-volatile content.

SUMMARY OF THE INVENTION

A stable waterborne, low VOC metallic-flake tint dispersion comprising, by weight of total dispersion, as follows:
(a) 2 to 15 percent of a metallic flake;
(b) 5 to 30 percent of polymeric binder;
(c) 0.1 to 3.0 percent by active weight of an organically-modified phosphoric-acid ester; and
(d) 55 to 90 percent of an aqueous carrier comprising at least 50 percent water;
wherein the composition is made by adding an aqueous resin dispersion comprising, by weight of aqueous resin dispersion, 70 to 95 percent water and 5 to 30 percent polymeric material to a solventborne dispersion of the metal flake containing said organically modified phosphoric-acid ester.

The pH of the dispersion can be preferably adjusted (increased) to 7.0–9.0 using ammonia or amine. Up to about 1% by weight of thickener dispersion resin solids can be added to adjust viscosity and increase shear-thinning characteristics necessary for application to automobiles and trucks. The composition can be used itself (neat) as a bright metal waterborne coating or combined (by stirring or rejuvenation) with aqueous binders and/or colored pigment dispersions and/or other compatible resins to form an automotive-quality metallic colorcoat. In any case, the resulting colorcoat or basecoat can then be applied over a primed steel or plastic substrate to give colored metallic basecoats having excellent and stable properties such as adhesion, humidity resistance, brightness and two-tone color (flop) required for exterior automotive applications. This basecoat can be used under a variety of aqueous and non-aqueous clearcoats to provide the same stable properties and also good durability and glamourous appearance.

DETAILED DESCRIPTION OF THE INVENTION

The waterborne metallic-flake tint dispersion or composition of the present invention may be produced in a two or three step process. In the first step, the metallic flake (typically a commercially available paste) is dispersed in a suitable compatible organic solvent, which also contains a passivating agent, to produce a solventborne metallic-flake dispersion. The level of passivating agent in this solventborne dispersion is suitably about 1 to 30 percent, preferably 5 to 20 percent by weight on metallic flake and the total solids of the dispersion is about 5 to 45 percent by weight. The amount of passivator is suitably adjusted to provide hydrogen gas inhibition by a sufficient amount passivator, but to avoid water-sensitivity problems with the coating caused by an excess amount of the passivator. Besides aluminum and its alloys, other metals which can be used in the present invention are zinc, bronze, brass, copper, iron, magnesium, and alloys thereof, and mixtures of the foregoing. In particular, there are a multitude of commercial grade aluminum pigments which are usable in this invention.

Typically, these metallic pigments are non-leafing flakes which are prepared as pastes by a milling process combining aluminum with a lubricant which is typically oleic acid and a pasting agent such as mineral spirits. During subsequent treatment of the material, solvent can be removed, different solvents or water can be added, and inhibiting agents and/or emulsifiers can be added. The final aluminum paste composition is typically 55–75% aluminum, 22–44% liquids, 1–3% oleic acid, and 0–5% inhibiting agents and/or emulsifiers. These aluminum pastes can be either water dispersible or non-dispersible. Such aluminum flakes have a size distribution which typically averages between 8 and 32 microns, but can be utilized within a range of about 3 to 50 microns. The shape and size distribution of flakes contributes to differences, among commercially available aluminum pastes, in terms of brilliance, sparkle, two-tone, smoothness, and lightness. These differences may be very important and are often exploited in the color design of metallic colorcoats for automobiles and trucks. Descriptions of conventional metallic pigments and pastes are provided in the standard reference PIGMENT HANDBOOK, ed. Temple C. Patton (Wiley-Interscience Publication 1973) pages 785–835.

Regarding the first step of the present invention, mentioned above, the compatible liquid organic solvent is one which has partial or complete miscibility with water and includes (but is not limited to) acetone, methyl ethyl ketone, diacetone alcohol, methanol, ethanol, isopropanol, 1-propanol, isobutanol, n-butanol, 2-butanol, n-pentanol, 2-pentanol, 2-methyl-1-butanol, methyl amyl alcohol, 2-methyl-1-pentanol, 2-ethyl hexanol, ethyl acetate, propyl acetate, butyl acetate, isobutyl acetate, PM acetate, butyl cellosolve acetate, ethyl carbitol, butyl cellosolve, methyl propasol, propyl propasol, butyl propasol, t-butyl propasol, water, and any combinations of such liquids. Preferred organic solvents are those having evaporation rates between 0.2 and 2.0 times the rate of butyl acetate and which have at least 2% miscibility in water. Preferred examples of these are n-butanol, propasol, isopropanol, isobutanol, and butyl cellosolve. Combinations of n-butanol and n-pentanol are particularly preferred.

The passivating agent is at least one organic phosphoric ester having a general formula as follows:

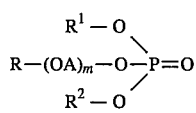

wherein R represents an alkyl group having 12 to 24 carbon atoms or a substituted aryl group, containing at least one alkyl substituent, having 12 to 24 carbon atoms. The group A represents an alkylene group having 2 to 4 carbon atoms, m represents an integer from 1 to 20, and $R^1$ and $R^2$ independently represent hydrogen, an alkyl group having 12 to 24 carbon atoms, or R-(OA)m (wherein R, A, and m are the same as set forth above). U.S. Pat. No. 4,350,535 generically describes esters which include the phosphate esters described above for use in this invention. These phosphate esters are commericially available from a variety of sources, including Mona Chemicals (Patterson, N.J.) and Rhone Poulenc (Princeton, N.J.)

As stated already, the first step of the invention requires the combining of the metallic flake, organic solvent, and a passivating agent. Usually, the metallic flake is added to the mixture of solvent and passivating agent and mixing is performed by an air-driven mixing blade of unspecified design. Sometimes heating of the mixture to from 90°–160° F. is helpful to insure miscibility and uniformity.

Required mixing time will vary, but a minimum of 90 minutes is typically needed to disperse aluminum flakes adequately. Additional mixing of several hours can be performed without deterioration of the aluminum-based aesthetics. High-shear mixing such as a Cowles® blade mixer should be avoided to prevent bending and splitting of the flakes. Prior to continuing to the second step of the invention, it is preferable to allow the metallic-flake dispersion to remain unmixed at room temperature for 8–12 hours or more for equilibration and stability of the coating. Longer waiting times are permissible, but the dispersion will typically begin to show settling of the metallic flake. In any case, the dispersion should be remixed just prior to using in step two.

In the second step, the metallic flake dispersion is combined with aqueous binder resin or resins and water to form a tint. Suitable resins include but are not limited to polymers and copolymers of acrylic, acrylourethane, polyesterurethane, polyetherurethane, polyamide, melamine-formaldehyde, and epoxy chemistries. The material is combined by adding each ingredient into a tank with mixing and stirring for a period not less than 30 minutes. Typically some rheology control agents, anti-settling agents, dispersants/surfactants, foam control agents, bacteriocides or other additives are also added, usually after the 30 minutes mix is complete. These are generally used at about 0–50% based on flake solids. Also, additional water is typically added, as required, to aid mixing.

The use of associative thickeners as part of the rheology package is preferred for achieving incorporation of the aqueous metallic flake with other compatible waterborne components. There are at least two types of rheological additives. The first is known as alkali-swellable (ASE) latex and the second is associative thickener latex (AT). In one embodiment, a combination of one ASE and two AT's is used. Two effective associative thickeners are Rohm & Haas's (Philadelphia, Pa.) Acrysol™ TT-615 and Henkel's (Ambler, Pa.) DSX-1550™ thickeners. Each is typically added at a level of about 1–15% by weight based on flake solids, preferably 1–10% of associative thickener latex and 5–15% of alkali-swellable thickener. In one embodiment, one ASE and two AT thickeners are used, comprising Acrysol® ASE-60, Acrysol® TF-615, and DSX-1550. In this embodiment, the three thickeners are added in a specified order during the tint manufacture, pH is increased, and then the viscosity is adjusted down to a constant Brookfield viscosity range using deionized water only.

Ammonia or amine is suitably added to adjust the pH to a level where the thickener resins are activated, typically in the range of 7 to 9. The VOC of the resulting tint dispersion is about 0.30 to 0.42 kg/l (minus water) which is equivalent to 2.5 to 3.5 lbs/gallon (minus water). The aqueous binder resin composition added to the solventborne metallic-flake dispersion suitably comprises, by weight of the aqueous binder resin, 5 to 30 percent, preferably 10 to 25 percent of polymeric material and 70 to 95 percent, preferably 75 to 90 percent (by weight) water. A preferred example of an aqueous binder resin comprises an acrylic polymer latex and an acrylic polymer hydrosol. See commonly assigned U.S. Pat. Nos. 5,166,254; 5,219,916; 5,221,584 and 5,266,406, all hereby incorporated by reference. Isopropanol, or isopropanol in combination with isobutanol, is preferably used in the hydrosol resin cook for aluminum tint stability. The strength of the waterborne metallic-flake dispersion is characterized by the pigment-to-binder weight ratio which is typically 10/100 to 50/100, but usually 20/100 to 30/100 which will allow nearly all automotive metallic colors to be matched.

The resulting stable waterborne, low VOC metallic-flake dispersion (also referred to as a tint) comprises, by weight of the dispersion, 1 to 15 percent, preferably 2 to 10 percent, of a metallic flake; 5 to 30 percent, preferably 10 to 20 percent, of polymeric binder (i.e., binder resin); 0.1 to 3.0 percent, preferably 0.2 to 1.0 percent of an organically-modified phosphoric-acid ester; and between 55 to 95 percent, preferably 60 to 80 percent of an aqueous solvent comprising between 50 and 90 percent, preferably 60 to 75 percent water.

This waterborne metallic-flake tint or dispersion can be applied as a basecoat itself or combined in any amount with other compatible binders and pigment (metallic and/or non-metallic) dispersions to form an automotive-quality color coat. For making automotive refinish basecoats, for example, the tints according to the invention are usually combined with various non-metallic colored tints, pearl tints, and/or resin binders (balanced clears.) For example, a final paint may typically comprise a metallic tint according to the present invenfion, a balancing clear (which may be similar to the aqueous resin dispersion described above), and three colored tints or dispersions, for example, one black, one white and one red. A tint may be used alone as a paint, for example, in the case of a silver metallic paint.

When combining with other components, it can be stirred together or more typically added into a container without any stirring and then rejuvenated by hand shaking or by using any of various paint shakers such as Red Devil®, Gyro®, or Cyclone® shakers for about 1–5 minutes to achieve excellent incorporation of aluminum into compatible binders and pigmented dispersion. Incorporation is evaluated by observing and measuring physical or chemical changes to the paint over a period of time. Typically, the period of time of interest for any changes will be from 1 day to 3 months. Evaluations are typically made on wet paint in the can or after applying films to a substrate. These changes include viscosity movement, pH drift, color change, metallic-flake floating, clumping, mottling or settling, and gas pressure build-up in a closed can. The gas build-up can be determined by volumetric displacement measurement techniques well known in the industry, but in practice is more typically evaluated by checking for oozing-out of a partially vented can or listening for a loud pop or hiss sound which occurs when opening a sealed can. After paint application on some substrates, such as dried primer-surfacer or clearcoat, evaluation of appearance characteristics such as head-on brightness, two-tone (flop), metallic non-uniformity (mottling) and smoothness provide clues to the level of incorporation of the waterborne metallic-flake dispersion. Finally, film properties such as adhesion to substrate and clearcoats, humidity cabinet resistance, and gloss changes in the colorcoat provide other indications of the quality of the dispersion and metallic paint. This system as described provides very good incorporation of metallic flake, without sacrificing humidity resistance, and has good long-term stability.

Application performance can be variable and is dependent on many factors, such as application equipment, booth conditions, number of coats required for hiding, and spray techniques. Two paint parameters which a sprayer wants to have some control over are the viscosity and the non-volatile content of the paint. These two parameters can influence the atomization of the paint out of the spray gun used to apply the paint. Thus, improved atomization is often obtainable through addition of water to the paint. This technique is limited, however, due to greater sag tendency and poorer hiding and transfer efficiency of the paint film. The waterborne metallic-flake tint dispersion described is readily dilutable with water as needed to decrease tinting strength, as well as lower viscosity and non-volatile content, without changing VOC level. No loss of metallic aesthetics is seen with water dilution and incorporation is well maintained.

The following examples illustrate the invention. All parts and percentages are on a weight basis unless otherwise indicated. All molecular weights disclosed herein are determined by gel permeation chromatography using a polystyrene standard.

EXAMPLE 1

This example illustrates a waterborne aluminum dispersion made according to the present invention. In subsequent examples, to evaluate its physical paint properties, this waterborne aluminum dispersion is used to make metallic basecoat compositions and evaluated for in-can and sprayed characteristics compared to solventborne aluminum and its basecoat composition. The final basecoat compositions are very similar in composition. The basecoat compositions are prepared by first forming an aluminum dispersion and then mixing the aluminum dispersion with acrylic latex binder components and colored pigment dispersions. The aluminum dispersion itself is made in two steps, first a solventborne aluminum dispersion is formed which is then combined with waterborne materials to make a waterborne aluminum dispersion. The following ingredients were used to make the solventborne aluminum dispersion in step one:

|  | Parts by Wt. |
|---|---|
| PART 1 | |
| n-butanol | 439 |
| n-pentanol | 1026 |
| polyoxyethylene stearyl ether phosphate (mixed mono/di ester) | 147 |
| PART 2 | |
| aluminum flake paste | 1612 |
| (60% solids in min. spirits/hydrocarbon solvent) | |
| TOTAL | 3224 |

Part 1 was added to an unlined metal gallon can and heated to a temperature of 110° F. using a hot water bath. The material was stirred using an air-mixer during the heating process. After 10 minutes, the mixture is a completely homogeneous liquid. The heating source is then removed, and the batch begins to cool. Then Part 2 is added over several minutes with vigorous stirring. The stirring continues until the aluminum flakes are well dispersed into the solvent/phosphate mixture, about 2 hours. Then the stirring is stopped and the material is stored for 12 hours at rest. The dispersion quality is tested by drawing down the dispersion on glass with a controlled film applicator (0.003 doctor blade). This solventborne aluminum dispersion is evaluated versus the waterborne aluminum dispersion made in step 2 below. The waterborne aluminum dispersion used the following ingredients:

|  | Parts by Wt. |
|---|---|
| PART 1 | |
| Acrylic polymer latex | 5661.8 |
| Acrylic polymer hydrosol | 1769.0 |
| Deionized water | 1243.5 |
| PART 2 | |
| Aluminum dispersion from step 1 above | 2350.8 |
| PART 3 | |
| Associative thickener (Henkel DSX-1550) | 30.3 |
| Acrysol ® ASE-60 thickener (Rohm & Haas) | 173.0 |
| Deionized water | 3390.4 |
| Aqueous ammonium hydroxide 3% active | 410.9 |
| PART 4 | |
| Deionized water | 1779.2 |
| Acrysol ® associative thickener TT-615 (Rohm & Haas) | 59.0 |
| Defoamer (Balab ® 3056A) | 7.5 |
| Deionized water | 1875.2 |
| TOTAL | 18750.6 |

In the above list of ingredients, the acrylic polymer latex (36% in deionized water) consists of 26.4 parts methyl methacrylate, 50 parts ethylhexyl acrylate, 2.5 parts methylol methacrylamide, 3 parts hydroxyethyl acrylate, and 3 parts methyl acrylic acid. The acrylic polymer hydrosol (in deionized water, isopropyl alcohol, and isobutyl alcohol) consists of 34 parts methyl methacrylate, 52 parts ethylhexyl methacrylate, 5 parts methylol methacrylamide, 3 parts hydroxyethyl acrylate, 3 parts methyl acrylic acid, and 2 parts surfactant. Part 1 ingredients are added to a 5-gallon lined pail and mixed for 15 minutes. Part 2, after re-mixing for 30 minutes, is then added slowly with mixing and allowed to mix rapidly for 60 minutes. Then Part 3 is added one ingredient at a time with mixing and then allowed to mix for 30 minutes. Finally, Part 4 is added one ingredient at a time with mixing and then allowed to mix for at least 30 minutes. The viscosity is controlled to 800–1500 cps (Brookfield 5 RPM at 72° F.). The pH is 8.3–8.5 and the P/B (pigment to binder ratio) is 27/100.

EXAMPLE 2

This example illustrates a charcaol gray metallic basecoat composition according to the present invention. The following ingredients were combined in a lined quart can:

| Basecoat 1 | |
|---|---|
| Component | Parts by Wt. |
| Waterborne aluminum dispersion made in Example 1, step 2 | 132 |
| Acrylic latex/acrylic copolymer thickened binder | 433 |
| Jet black waterborne dispersion | 43 |
| White pearl mica waterborne dispersion | 22 |
| TOTAL | 630 |

The mixing process was performed in two ways. First, each ingredient was added with mixing by an air mixer. Second, each ingredient was added without mixing and then put on a Red Devil® rejuvenator for 3 minutes.

COMPARATIVE EXAMPLE 3

This example illustrates a comparative charcoal gray metallic basecoat (basecoat 2), not according to the present invention, for comparison to the basecoat (basecoat 1 ) of Example 2 above. The following ingredients were combined in another lined quart can:

| Component | Parts by Wt. |
|---|---|
| Solventborne aluminum dispersion (Example 1, step 1 above) | 17 |
| Acrylic latex/acrylic copolymer thickened binder | 548 |
| Jet black waterborne dispersion | 43 |
| White pearl mica waterborne dispersion | 22 |
| TOTAL | 630 |

The mixing process was performed in two ways. First, each ingredient was added with mixing by an air mixer. Second, each ingredient was added without mixing and then put on a Red Devil® rejuvenator for 3 minutes.

EXAMPLE 4

This example illustrates a silver metallic basecoat composition (basecoat 3) according to the present invention. The following ingredients were combined in a lined quart can:

| Component | Parts by Wt. |
|---|---|
| Aluminum dispersion (step 2 from Example 1) | 420 |
| Acrylic latex/acrylic copolymer thickened binder | 210 |
| TOTAL | 630 |

The basecoat compositions above are controlled to a viscosity of 700–1200 cps (Brookfield 5 RPM, 72° F.). The pH is controlled to 8.4–8.6 using aqueous ammonia and/or deionized water as needed. No additional additives were made to these basecoats. A fraction of each basecoat is set aside on the shelf and in a heated stability oven to measure the stability with time and temperature. All basecoats were applied to complete hiding over a cured commercial solventborne two-component polyurethane primer-surfacer, which had been applied to clean steel panels. Some basecoated panels were then clearcoated with a commercial solventborne two-component polyurethane clearcoat which is allowed to air-dry cure for a three-week period. Typical film thickness of these coatings are as follows:

| Primer-Surfacer | 0.8–1.2 mils |
|---|---|
| Basecoat | 0.3–0.8 mils |
| Clearcoat | 1.0–2.0 mils |

Data was obtained for both wet and applied paint. In-can (wet) properties are shown in Table 1 below. Film properties are shown in Table 2 below. The results clearly show that basecoat 1 is much better than basecoat 2 for floating resistance and also slightly better in humidity performance.

TABLE 1

| A<br>Paint Name | B<br>Paint Color | C<br>Process Description | D<br>Alum P/B | E<br>pH | F<br>Brkfld Visc | G<br>Theor. VOC |
|---|---|---|---|---|---|---|
| 1 Alum Disp (Step 1) | Aluminum | Solventborne Mix | N/C | — | 1300 | 5.63 |

TABLE 1-continued

| | | | | | | | |
|---|---|---|---|---|---|---|---|
| 2 | Alum Disp (Step 2) | Aluminum | Waterborne Mix | 27.2 | 8.7 | 1200 | 3.08 |
| 3 | Basecoat 1 | Charcoal Gray Metallic | Stirring Each Ingred. | 6.8 | 8.5 | 976 | 1.7 |
| 4 | Basecoat 2 | Charcoal Gray Metallic | Stirring Each Ingred. | 7.4 | 8.6 | 936 | 1.77 |
| 5 | Basecoat 1 | Charcoal Gray Metallic | Add, then rejuvenate | 6.8 | 8.6 | 976 | 1.7 |
| 6 | Basecoat 2 | Charcoal Gray Metallic | Add, then rejuvenate | 7.4 | 8.5 | 928 | 1.77 |
| 7 | Basecoat 3 | Silver Metallic | Add, then rejuvenate | 18.9 | 8.5 | 904 | 2.64 |

| | H | I | J | K | L | M | N | O | P |
|---|---|---|---|---|---|---|---|---|---|
| | In-Can Floating of Alum Flake | | 7 Days × 120° F. Oven Stability | | 21 Days × 130° F. ml $H_2$ Gas per Gram | | 3 Months × Room Temp. Stability | | |
| | Just after rejuv | 24 hrs after rejuv | Δ pH | Δ Viscosity | | Aluminum Solid | Δ pH | Δ Viscosity | Settling |
| 1 | None | None | — | — | None | | — | 30% | Solvent Sep |
| 2 | None | None | — | — | 4.4 | | -0.2 | 25% | None |
| 3 | None | None | -0.1 | -24 | 7.2 | | -0.2 | 184 | Very Slight |
| 4 | 30% | 50% | -0.2 | -416 | 8.9 | | -0.3 | 234 | Very Slight |
| 5 | None | 9% | -0.2 | -16 | 7.4 | | -0.1 | 204 | Very Slight |
| 6 | 50% | 100% | -0.1 | -376 | 8.7 | | -0.3 | 342 | Very Slight |
| 7 | None | None | -0.1 | -176 | 4.5 | | -0.3 | 236 | Very Slight |

TABLE 2

FILM PROPERTIES AFTER HUMIDITY CABINET EXPOSURE

| | Air-Dried Basecoat without Clear 96 Hr. × 100° F./100% R. H. | | | | Baked Basecoat without Clear 96 Hr. × 100° F./100% R.H. | | | | Air-Dried Basecoat with Clear 96 Hr. × 100° F./100% R.H. | | | | |
|---|---|---|---|---|---|---|---|---|---|---|---|---|---|
| | Adhesion | Humidity Resist | Tukon Hardness | HOB* | Adhesion | Humidity Resist | Tukon Hardness | HOB* | Hunter DOI | Adhesion | Humidity Resist | HOB* | Two-Tone Flop |
| Basecoat 1 | ++ | + | 6.6 | 89 | ++ | ++ | 6.1 | 90 | 47 | ++ | ++ | 74 | 13.6 |
| Basecoat 1 | ++ | + | 7.1 | 87 | ++ | ++ | 10.7 | 88 | 58 | ++ | ++ | 74 | 13.6 |
| Basecoat 2 | ++ | + | 6.8 | 89 | ++ | ++ | 8.9 | 89 | 56 | ++ | + | 72 | 13.8 |
| Basecoat 2 | ++ | + | 7.3 | 93 | ++ | ++ | 8.9 | 93 | 60 | ++ | + | 72 | 14.4 |
| Basecoat 3 | ++ | ++ | 5.9 | 147 | ++ | ++ | 8.7 | 147 | 86 | ++ | ++ | 131 | 11.9 |

*HOB = Head on Brightness
Adhesion: ++ = very good adhesion based on grid-hatch test
Humidity Resist: ++ = no adhesion loss, slight microfine blistering
+ = no adhesion loss, moderate microfine blistering

EXAMPLE 5

An aluminum waterborne dispersion according to the present inventino is made in two steps as follows. In step one, the following ingredients are used:

| PART 1 | |
|---|---|
| Ethylene glycol monobutyl ether | 80.0 |
| n-Butanol | 30.0 |
| Ethylene glycol monohexyl ether | 20.0 |
| Polyoxyethylene stearyl ether phosphate (mixed mono/di ester) | 17.0 |
| PART 2 | |
| Aluminum flake paste (60% solids in mineral spirits and aromatic hydrocarbon) | 147.0 |
| TOTAL | 294.0 |

Part 1 was added to an unlined metal pint can and heated to a temperature of 130° F. using a hot-water bath. The material is stirred using an air-mixer during the heating process. After 15 minutes, the mixture is a completely homogeneous liquid. The heating source is removed, and the batch cools to 70° F. Then Part 2 is added over 2 minutes with vigorous stirring. Stirring is continued for 1.5 hours. Then the stirring was discontinued and the dispersion was left for 36 hours undisturbed. In step 2, the following ingredients were used:

| | Parts by Wt. |
|---|---|
| PART 1 | |
| Acrylic polymer latex | 127.0 |
| Acrylic polymer latex | 207.0 |
| Deionized water | 56.0 |
| PART 2 | |
| Aluminum dispersion from above step | 127.0 |
| PART 3 | |
| 10% Acrysol ASE-60 ® thickener (Rohm & Haas) in deionized water | 94.0 |
| Deionized water | 152.0 |
| Aqueous ammonia (3% active) | 12.0 |
| PART 4 | |
| Defoamer (Balab ® 3056A) | 10.0 |

|                                              | Parts by Wt. |
| -------------------------------------------- | ------------ |
| Acrysol ASE-60 ® (25%) thickener in deionized water | 55.0  |
| TOTAL                                        | 830.0        |

The first acrylic polymer latex was the same as used in Example 1 above. The second acrylic polymer latex is made in two stages and comprises 13 percent methyl methacrylate, 2 percent allyl methacrylate, and 62 percent butyl acrylate as core monomers, and 3 percent methacrylic acid, 5 percent hexylethyl acrylate, and 15 percent butyl acrylate as shell monomers. Part 1 ingredients are added to a lined quart can and mixed for 15 minutes. Part 2, after remixing 15 minutes, is added slowly with mixing and allowed to mix 45 minutes. Part 3 is added one-ingredient at a time and mixed for 30 minutes. Finally, Part 4 is added and mixed for 15 minutes. The final viscosity is 2540 cps (Brookfield #2, 5 RPM) at a pH of 6.74.

EXAMPLE 6

This examples illustrates another charcoal gray metallic baecoat composition (basecoat 4) according to the present invention. The following components were used:

| Component | Parts by Weight |
| --------- | --------------- |
| Waterborne aluminum dispersion Step 2 from Example 5 above | 100.0 |
| Aluminum-free paint containing: Acrylic latex/melamine-formaldehyde Carbon black waterborne dispersion Organic blue waterborne dispersion Mica pearl waterborne dispersion | 530.0 |
| TOTAL | 630.0 |

The well mixed aluminum dispersion is put in a lined metal quart can. The aluminum-free paint is added to the dispersion without mixing. The quart can was sealed closed and placed on a Gyro® paint shaker for 2 minutes. After removing from the shaker, the paint is tested for properties. The results were as follows:

| Initial Floating After Shaker: | None |
| Floating 24 hrs After Shaker: | None |
| Brookfield Visc (#2 sp, 5 RPM) | 2020 cps |
| After 24 Hours × 75° F. | 2040 cps |
| After 3 Months × 75° F. | 1240 cps |
| After 1 week × 120° F. | 1050 cps |

The sprayout showed good aluminum orientation and no spitting or clumping under a commercial polyurethane clearcoat. The 96-hour humidity adhesion was excellent. No delamination occurred when scribing 100 squares and pulling tape. No significant build-up of gas developed in sealed cans stored for 3 months at 75° F. or one wk at 120° F.

Those skilled in the art will no doubt be able to compose numerous variations of the themes disclosed, such as changing the amounts of ingredients insignificantly from those shown, adding innocuous or supplementary substances, or substituting equivalent components for those shown. Such variations are considered to be within the inventive concept, as defined in the following claims.

We claim:

1. A stable waterborne tint composition for use on automotive substrates comprising, by weight of the tint composition, as follows:
    (a) 2 to 15 percent of a metallic flake;
    (b) 5 to 30 percent of an aqueous-dispersible polymeric binder;
    (c) 0.1–3.0% by active weight of an organically-modified phosphoric-acid ester; and
    (d) 55 to 90 percent of an aqueous solvent comprising at least 50 percent water, the balance comprising $C_2$ to $C_8$ alcohol;

wherein the composition is made by adding a resin dispersion comprising 70 to 95 percent water and 5 to 30 percent polymeric material to a solventborne dispersion of the metal flake containing said organically modified phosphoric-acid ester having the formula:

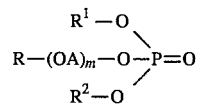

wherein R represents an alkyl group having 12 to 24 carbon atoms or a substituted aryl group, containing at least one alkyl substituent, having 12 to 24 carbon atoms, and wherein the group A represents an alkylene group having 2 to 4 carbon atoms, m represents an integer from 1 to 20, and $R^1$ and $R^2$ independently represent hydrogen, an alkyl group having 12 to 24 carbon atoms, or R—(OA)m wherein R, A, and m are the same as set forth above; and wherein composition stability is evidenced by substantially nonfloating metallic flake.

2. The composition of claim 1, wherein the composition has a VOC of 0.30 to 0.42 kg/l (minus water).

3. The composition of claim 1 wherein the metallic flake is aluminum.

4. The composition of claim 1, wherein the binder comprises an acrylic latex dispersion copolymer.

5. The composition of claim 1, wherein the composition further comprises a thickener.

6. The composition of claim 1, wherein the dispersion has a pigment-to-binder ratio of from 10/100 to 50/100.

7. A method for making a stable waterborne, low VOC metallic-flake tint dispersion comprising:
    (a) mixing a metallic-flake paste comprising, by weight, 55 to 75 percent metallic flake in organic solvent, which contains a passivating agent, to produce a solventborne metallic-flake dispersion, wherein the level of passivating agent in this solventborne dispersion is about 1–30 percent by weight on metallic flake and the total solids of the solventborne metallic-flake dispersion is about 5–45% by weight, wherein the metallic flakes are dispersed for at least 90 minutes and, prior to continuing to step (b) below, the solventborne metallic-flake dispersion remains unmixed at room temperature for at least 8–12 hours; and
    (b) mixing said solventborne metallic-flake dispersion produced in step (a) with a resin dispersion comprising, by weight of resin dispersion, 5 to 30 percent polymeric material and 70 to 95 percent water;

the passivating agent having the following formula:

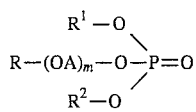

wherein R represents an alkyl group having 12 to 24 carbon atoms or a substituted aryl group, containing at least one alkyl substituent, having 12 to 24 carbon atoms, and wherein the group A represents an alkylene group having 2 to 4 carbon atoms, m represents an integer from 1 to 20, and $R^1$ and $R^2$ independently represent hydrogen, an alkyl group having 12 to 24 carbon atoms, or R—(OA)m wherein R, A, and m are the same as set forth above.

8. The method of claim 7, wherein the waterborne metallic-flake dispersion is mixed with at least one other pigment dispersion to form a colorcoat composition for application to an automotive substrate.

* * * * *